United States Patent Office 3,334,094
Patented Aug. 1, 1967

3,334,094
AMINOPHENOTHIAZINE CARBOXYLIC
ACID DERIVATIVES
John S. Driscoll, Lynnfield, Mass., assignor to Monsanto Research Corporation, St. Louis, Mo., a corporation of Delaware
No Drawing. Filed June 23, 1965, Ser. No. 466,470
9 Claims. (Cl. 260—243)

This invention relates to new phenothiazine compounds and more particularly provides novel diaminophenothiazinecarboxylic and diaminophenazathioniumcarboxylic acids and salts thereof.

The compounds provided in accordance with the present invention are of the formula

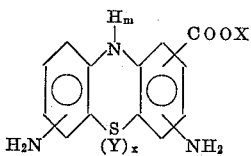

wherein

is a 6-membered aromatic hydrocarbon ring containing conjugated unsaturation, Y is an anion, X is a cation, and $x$ and $m$ are integers of which one is 0 and the other is 1.

The phenothiazinecarboxylic acid and salt compounds provided by the present invention include dyes of the formula

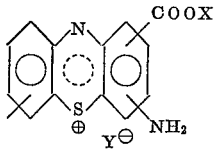 (I)

wherein X is H or a salt-forming cation, and the dotted bonds in the central ring represent resonance contributors such as

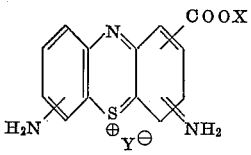 (Ia)

and

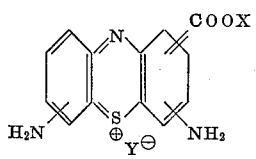 (Ib)

As those skilled in the art will appreciate, the stated structures may include still further resonance contributors such as

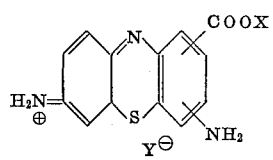 (Ic)

and

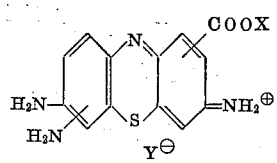 (Id)

The molecular structure is the same in Ia and Ib as in Ic and Id, and the pairs differ only in the charge distribution; accordingly, the compounds will be referred to hereinafter for brevity as phenazathionium salts (Formula I).

The presently provided compounds further include the precursors of the dyes represented by Formula I, such precursors having the formula

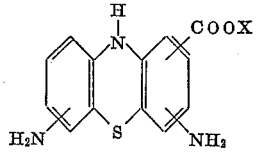 (II)

These are the compounds of the above formula where $m$ is 1 and $x$ is 0.

X in the general formula of the present compounds can be H or a salt-forming cation, of the metallic or ammonium, particularly organo-ammonium, type.

The stated compounds are each prepared by reduction of a dinitrophenothiazinecarboxylic acid compound, to produce the stated precursor II, and subsequent oxidation of this precursor, to produce the dye compounds of the Formula I, as illustrated by the equation

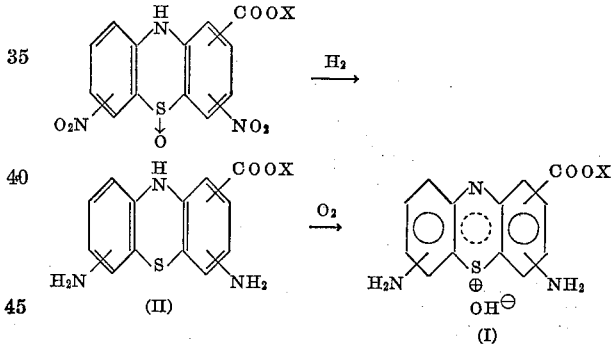

As will be appreciated, and as further discussed hereinafter, the anion associated with the sulfonium position can be varied from the illustrated hydroxide ion.

Referring now in more detail to the presently provided diaminophenothiazinecarboxylic acids and salts (Formula II), these are illustrated, for example, by 3,7-diaminophenothiazine-1-carboxylic acid, 1,7-diaminophenothiazine-2-carboxylic acid, 4,7-diaminophenothiazine-3-carboxylic acid, 3,9-diaminophenothiazine-3-carboxylic acid, 3,8-diaminophenothiazine-1-carboxylic acid, 3,7-diaminophenothiazine-4-carboxylic acid, 3,7-diaminophenothiazine-2-carboxylic acid, 2,7-diaminophenothiazine-1-carboxylic acid, 1,7-diaminophenothiazine-4-carboxylic acid, 3,6 - diaminophenothiazine-1-carboxylic acid, and the like, alkali metal salts of these acids including for example the sodium, potassium and lithium salts of the above-listed acids and also, ammonium salts of acids such as those listed above, including organo-substituted ammonium salts, such as ammonium 3,7-diaminophenothiazine - 1 - carboxylic acid, triethylammonium 3,9-diaminophenothiazine-1 - carboxylate, diethylbenzylammonium 3,7-di - diaminophenothiazine-1-carboxylate, triethylammonium 1,9 - diaminophenothiazine-3-carboxylate, triethylammonium 3,7-diaminophenothiazine-1-carboxylate, pyridinium 3,7 - diaminophenothiazine-1-carboxylate, dibutylmethylammonium 1,7-diaminophenothiazine-3-carboxylate, piperidinium 3,9-diaminophenothiazine-2-carboxylate and the like.

Additionally, the present invention provides diaminophenazathionium carboxylic acid salts of the formula

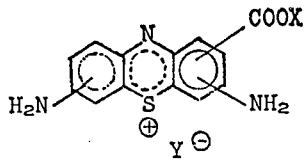

wherein X is H or a cation as defined above and Y is an anion. These are exemplified, for example, by 1-carboxy-3,7 - diaminophenazathionium hydroxide, sodium 3,7-diaminophenazathionium-1-carboxylate hydroxide, sodium 3,7 - diaminophenazathionium - 2-carboxylate hydroxide, ammonium 3,7-diaminophenazathionium-1-carboxylate chloride, ammonium 1,7-diaminophenazathionium-1-carboxylate chloride, lithium 3,8-diaminophenazathionium-1 - carboxylate bromide, sodium 1,9-diaminophenazathionium - 4 - carboxylate bromide, sodium 1,9 - diaminophenazathionium-4-carboxylate bromide, potassium 3,6-diaminophenazathionium-2-carboxylate bisulfate, diethylammonium 1,7-diaminophenazathionium-2 - carboxylate bisulfate, triethylammonium 2,7 - diaminophenazathionium-3-carboxylate hydroxide, sodium 3,9-diaminophenazathionium-1-carboxylate hydroxide, sodium 4,9-diaminophenazathionium-1-carboxylate chloride, ammonium 1,7-diaminophenazathionium-2-carboxylate chloride, benzyldiethylammonium 2,7-diaminophenazathionium-3-carboxylate chloroplatinate, triethylammonium 3,7-diaminophenazathionium-1-carboxylate iodide, dimethyloctyl 3,7-diaminophenazathionium-2-carboxylate hydroxide, benzyldiethylammonium 3,9-diaminophenazathionium-1-carboxylate chloride, lithium 3,7-diaminophenazathionium-1-carboxylate hydroxide, pyridinium 3,7-diaminophenazathionium - 1 - carboxylate chloride and the like.

The presently provided compounds are, in general, prepared by reduction of the corresponding dinitrophenothiazine carboxylic acid 5-oxides and salts, to prepare the stated diaminophenothiazinecarboxylic acids and salts, as illustrated by the above equation. It will be noted that the oxygen on the sulfur atom is removed in this reduction in addition to the conversion of the nitro groups to amino groups.

The diaminophenothiazinecarboxylic acids and salts are oxidation-sensitive and relatively unstable. A diaminophenothiazinecarboxylic acid or salt slowly oxidizes to produce the diaminophenazathioniumcarboxylic acid or salt.

Preparation of the stated dinitrophenothiazinecarboxylic acid and salt sulfoxides can be conducted as described in my copending, concurrently filed application, by reacting a phenothiazine-ar-carboxylic acid or an ar-nitrophenothiazine-ar-carboxylic acid with nitric acid, as illustrated by the following equation

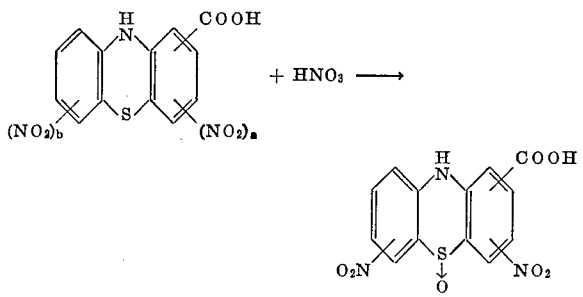

where $a$ and $b$ are 0 or 1 and their sum is 0 or 1. This reaction is readily carried out as described, for example, hereinbelow.

To prepare the presently provided dye precursors (II), the dinitrophenothiazinecarboxylic acid sulfoxides are either employed as such or first converted to a carboxylate salt. This is preferably an organo-ammonium salt, that is, a salt with an amine having from one to three organic substituents, such as hydrocarbon radicals free of aliphatic unsaturation and containing up to 10 C atoms.

Exemplary of the dinitrophenothiazinecarboxylic acid and salt sulfoxides useful in preparing the compounds of this invention are, for example:

3,7-dinitrophenothiazine-1-carboxylic acid-5-oxide,
3,7-dinitrophenothiazine-4-carboxylic acid-5-oxide,
2,7-dinitrophenothiazine-3-carboxylic acid-5-oxide,
1,7-dinitrophenothiazine-2-carboxylic acid-5-oxide,
3,7-dinitrophenothiazine-2-carboxylic acid-5-oxide,
1,9-dinitrophenothiazine-2-carboxylic acid-5-oxide,
3,6-dinitrophenothiazine-3-carboxylic acid-5-oxide,
3,6-dinitrophenothiazine-4-carboxylic acid-5-oxide,
3,9-dinitrophenothiazine-1-carboxylic acid-5-oxide,
3,9-dinitrophenothiazine-2-carboxylic acid-5-oxide,
3,8-dinitrophenothiazine-1-carboxylic acid-5-oxide,
2,9-dinitrophenothiazine-1-carboxylic acid-5-oxide,
2,9-dinitrophenothiazine-3-carboxylic acid-5-oxide,
1,9-dinitrophenothiazine-2-carboxylic acid-5-oxide, and ammonium salts of the said acids such as their ammonium, diethylammonium, ethylammonium, dibutylammonium, butylammonium, benzyldiethylammonium, benzyldimethylammonium, benzyldipropylammonium, benzylethylmethylammonium, triethylammonium, tripropylammonium, trihexylammonium, diethylhexylammonium, tributylammonium, trioctylammonium, piperidinium, lutidinium, pyridinium, and cyclohexyldimethylammonium salts.

For the production of strongly-colored dyes, it is preferred that at least one, and desirably both of the ring substituents other than the carboxy group (nitro in the starting materials and amino in the dye precursors of Formula II) be in the 1, 3, 7 or 9 position, and preferably both be in one of these four positions.

To convert the nitro-substituted phenothiazinecarboxylic acid or salt sulfoxides to the dye precursors (II), they are catalytically hydrogenated by exposure to hydrogen gas in the presence of a catalyst. Usual known hydrogenation catalysts may be employed, such as platinum oxide, palladium on carbon, or the like. It is ordinarily convenient to contact the acid or salt with the catalyst and the hydrogen under superatmospheric pressure, in a bomb or other pressure vessel, and pressures used therefor may range up to 5000 p.s.i.g., for example, though up to about 50 p.s.i.g. is usually sufficient. If desired, the hydrogenation can even be conducted at atmospheric pressure, by passing hydrogen gas through the acid or salt mixture with the catalyst. It is generally desirable to include an inert solvent or diluent in the hydrogenation mixture; this can be any of a wide variety of usual organic solvents, such as methanol, ethanol, diethylene glycol, dimethyl ether, benzene, toluene, hexane, and so forth. The hydrogenation can be conducted at temperatures from 0° C. to as high as 200° C. or 250° C., but it proceeds readily at ambient temperature (65–85° F.), and this is usually suitable and convenient.

On conclusion of the hydrogenation, the reaction mixture is separated from the gaseous hydrogen and catalyst, providing the precursor (II), which may be in solution when suitable solvents are used in the hydrogenation.

To convert these precursors to the dyes of structure (I), a solution of the appropriate precursor need merely be exposed to air, to produce its oxidation. Oxidizing agents can be employed in effecting this oxidation if desired, such as hydrogen peroxide, oxygen gas, ferric chloride, and the like, but simple exposure to air is both convenient and effective. The solution of the precursor can be pressurized (with air or oxygen) to pressures as high as, say, 5000 p.s.i.g., but atmospheric pressure is effective and suitable; also heating, to temperatures below the decomposition temperatures of the reaction mixture components, up to 100° or even 200° C. for example, can be applied to accelerate the conversion, but ordinary ambient temperature is again suitable and convenient.

Subsequent removal of the solvent provides the desired dye products, of structure (I). As will be appreciated, the solution of the dye can be employed as produced, to effect the dyeing of cloth by immersion therein, for example; and indeed, cloth can be dyed by immersing it in a solution of the dye precursor (II), with subsequent exposure to air to effect the oxidation to the corresponding dye.

The acid or salt gives a diaminophenazathionium hydroxide salt in its air oxidation in the presence of moisture (present as atmospheric air moisture content or water produced in the prior hydrogenation), the hydroxide ion deriving from the water present. If desired, this may be replaced with a different anion, either by conducting the oxidation with an oxidizing agent supplying a different anion, such as a source of $Cl^{\ominus}$ like ferric chloride or by producing the hydroxide and following procedures usual in the conversion of quaternary salts to salts with a different anion. For example, the diaminophenazathionium hydroxide carboxylate salt can be mixed in solution (aqueous, alcoholic or the like) with an acid having the desired anion, such as hydrochloric, sulfuric, acetic, chloroplatinic or the like, in a ratio of at least two moles of the acid per mole of the salt, producing metathesis of the hydroxide anion. The accompanying conversion of the carboxylate salt group to the free acid may be accepted, so that the compound isolated is the free acid

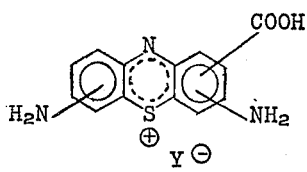

or this acid may be mixed with an equivalent of base—either an amine to provide a carboxylate salt with a substituted ammonium cation of the same nature as in the original carboxylate salt, or with another base, such as an alkali metal or ammonium hydroxide—to produce the carboxylate salt.

The invention is illustrated but not limited by the following examples.

*Example 1*

This example illustrates the preparation of a diaminophenazathionium hydroxide 1-carboxylate ammonium salt.

To preparte 3,7-dinitrophenothiazine-1-carboxylic acid-5-oxide, 12 g. (0.05 mole) of phenothiazine-1-carboxylic acid is heated on a steam bath in 500 ml. of glacial acetic acid for 2 hours, with stirring, to solubilize the heterocyclic compound in the acid, and then the stirred solution is let cool to room temperature and finally chilled to 5° C. with an ice bath. Then 113 g. (1.8 mole) of concentrated nitric acid is added to the stirred, cooled solution over a period of thirty minutes. After completion of addition of the nitric acid, the ice bath is removed and the solution is stirred at room temperature for 30 minutes and finally heated on a steam bath (92° C.) for an hour. The resulting suspension is cooled to 35° C. and poured into 500 ml. of water. This produces a brown precipitate which is filtered off, washed with 100 ml. of water, stirred with 135 ml. of acetone, filtered off and dried to give a yellow solid product. Two precipitations of this product from 5% aqueous sodium hydroxide with dilute hydrochloric acid produce 3,7-dinitriphenothiazine-1-carboxylic acid-5-oxide, M.P. 260–261° C. (decomp.).

To provide the diaminophenazathionium salt, 0.87 g. of the twice-recrystallized 3,7-dinitrophenothiazine-1-carboxylic acid-5-oxide is suspended in 150 ml. of methanol to which 0.25 g. of triethylamine is added. The mixture is let stand for one hour and filtered. The amber filtrate is a methanol solution of triethylammonium 3,7-dinitrophenothiazine-1-carboxylate-5-oxide.

To the filtrate is added 0.25 g. of catalytic (finely divided) platinum oxide, after which the mixture is pressured with hydrogen at 25° C. for three and one half hours. The resulting dark brown solution is filtered to provide a water-containing methanol solution of triethylammonium 3,7 - diaminophenothiazine - 1 - carboxylate. This filtrate is exposed to the atmosphere for 9 days, during which time it changes color as oxidation proceeds. Filtration of the resulting dark blue solution and evaporation of the filtrate under vacuum yields triethylammonium 3,7 - diaminophenazathionium hydroxide - 1 - carboxylate as the hemihydrate, obtained as purple crystals, M.P. 130° C. (decomp.), having an elemental analysis corresponding to the assigned structure of $$C_{19}H_{26}N_4O_3S \cdot \tfrac{1}{2} H_2O$$

and spectra corresponding to the assigned structure.

*Example 2*

This example illustrates preparation of a 1-carboxy-3,7-diaminophenazathionium hydroxide.

A Paar bomb is charged with 0.50 g. of 3,7-dinitrophenothiazine-1-carboxylic acid-5-oxide and 0.10 g. of $PtO_2$ in 100 ml. of methanol and pressured with hydrogen to about 40 p.s.i.g. and shaken at 20–25° C. for 3 hours. The reaction mixture is filtered; the brown filtrate is a solution of 3,7-diaminophenothiazine-1-carboxylic acid.

This filtrate is let stand overnight exposed to atmospheric air. The now purple solution is evaporated to dryness to give 1-carboxy-3,7-diaminophenazathionium hydroxide, M.P. >300° C.

*Example 3*

This example illustrates utilization of a compound in accordance with this invention as a dye.

A swatch of cotton cloth is immersed in a methanol solution of 1-carboxy-3,7-diaminophenazathionium hydroxide at room temperature. The cloth is dyed a uniform deep blue color, which, after drying, does not fade in over a year's time; and the cloth retains its color after washing in water.

*Example 4*

This example illustrates another utilization of a compound provided in accordance with this invention.

1-carboxy-3,7-diaminophenazathionium hydroxide is dissolved in an agar solution supporting the growth of the bacterial organism, *Staphylococcus aureus*, to provide a concentration of 1 part per thousand of the phenothiazine compound in the solution. After solidification, the agar is inoculated with *S. aureus* and the inoculated substrate is maintained under conditions conducive to growth of the bacteria. After such incubation, it is found that the presence of the phenothiazine compound has suppressed growth of the bacterium in the substrate.

While the invention has been described with particular reference to specific preferred embodiments thereof, it will be appreciated that modifications and variation can be made without departing from the scope of the invention as disclosed herein, which is limited only as indicated in the following claims.

What is claimed is:

1. An aminophenothiazine carboxylic acid compound conforming to Formula I or Formula II below comprising:

Formula I

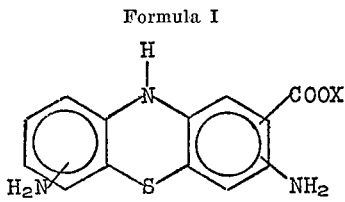

wherein each

is a benzene ring having a NH$_2$-radical attached thereto; X is selected from the group consisting of hydrogen, sodium, potassium, lithium, an ammonium radical and an organo-ammonium radical having 1 to 3 hydrocarbon radical substituents free of aliphatic unsaturation and containing up to 10 carbon atoms; and Formula II

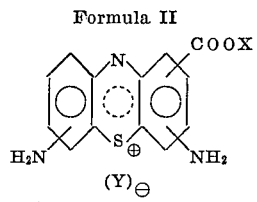

wherein each

is a 6 membered hydrocarbon aromatic ring containing conjugated unsaturation with one H$_2$N— group attached thereto; X is selected from the group consisting of hydrogen, sodium, potassium, lithium, an ammonium radical and an organo-ammonium radical having 1 to 3 hydrocarbon radical substituents free of aliphatic unsaturation and containing up to 10 carbon atoms and Y is an anion, said compounds conforming to Formula II comprising the contributing resonance structures as set forth in Formulas III, IV, V and VI below:

Formula III

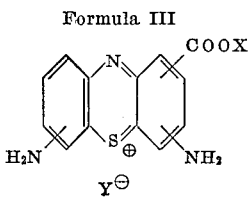

Formula IV

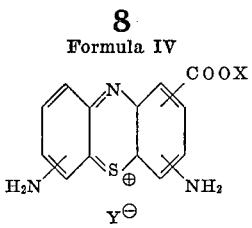

Formula V

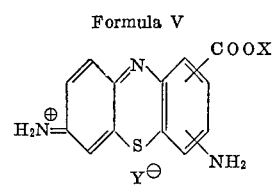

Formula VI

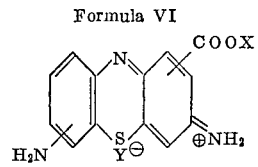

2. A compound of claim 1 of Formula I wherein said compound is an ar, ar'-diaminophenothiazinecarboxylic acid or a salt thereof.

3. 3,7-diaminophenothiazine-1-carboxylic acid.

4. A compound of claim 1 of Formula I wherein said compound is an organoammonium ar, ar'-diaminophenothiazine carboxylate.

5. Triethylammonium 3,7-diaminophenothiazine-1-carboxylate.

6. A compound of claim 1 of Formula II wherein said compound is an ar, ar'-diaminophenazathionium carboxylic acid or a salt thereof.

7. 1-carboxy-3,7-diaminophenazathionium hydroxide.

8. A compound of claim 1 of Formula II wherein said compound is an organoammonium ar, ar'-diaminophenazathionium carboxylate salt.

9. Triethylammonium 3,7-diaminophenazathionium hydroxide 1-carboxylate.

No references cited.

WALTER A. MODANCE, *Primary Examiner.*

HARRY I. MOATZ, *Assistant Examiner.*